(12) United States Patent
Ramappan et al.

(10) Patent No.: US 8,915,236 B2
(45) Date of Patent: Dec. 23, 2014

(54) SYSTEMS AND METHODS FOR CONTROLLING ENGINE COMBUSTION STABILITY

(75) Inventors: Vijay Ramappan, Novi, MI (US); Darrell W. Burleigh, South Lyon, MI (US); B. Jerry Song, Novi, MI (US)

(73) Assignee: GM Global Technology Operations LLC

( * ) Notice: Subject to any disclaimer, the term of this patent is extended or adjusted under 35 U.S.C. 154(b) by 785 days.

(21) Appl. No.: 13/192,832

(22) Filed: Jul. 28, 2011

(65) Prior Publication Data

US 2012/0247439 A1 Oct. 4, 2012

Related U.S. Application Data

(60) Provisional application No. 61/470,139, filed on Mar. 31, 2011.

(51) Int. Cl.
| | | |
|---|---|---|
| *F02M 25/07* | (2006.01) | |
| *F02D 41/14* | (2006.01) | |
| *F02M 35/10* | (2006.01) | |
| *F01M 13/02* | (2006.01) | |
| *F02D 41/00* | (2006.01) | |
| *F02M 25/06* | (2006.01) | |
| *F02B 1/12* | (2006.01) | |

(52) U.S. Cl.
CPC .......... *F02D 41/0052* (2013.01); *F02D 41/144* (2013.01); *Y02T 10/47* (2013.01); *F02M 35/10222* (2013.01); *F01M 13/022* (2013.01); *F02M 25/072* (2013.01); *Y02T 10/128* (2013.01); *F02D 41/1454* (2013.01); *F02M 25/06* (2013.01); *F02D 2200/021* (2013.01); *F02B 1/12* (2013.01)
USPC ...................................... 123/568.11; 701/108

(58) Field of Classification Search
USPC ............ 123/568.11, 568.12, 568.21, 568.17, 123/568.18; 701/102, 108, 109
See application file for complete search history.

(56) References Cited

U.S. PATENT DOCUMENTS

| | | | | |
|---|---|---|---|---|
| 4,248,193 | A * | 2/1981 | Choma et al. | 123/350 |
| 7,155,332 | B2 * | 12/2006 | Yamada et al. | 701/108 |
| 7,370,616 | B2 | 5/2008 | Kuo et al. | |
| 2006/0069494 | A1 | 3/2006 | Yamada et al. | |

FOREIGN PATENT DOCUMENTS

| | | | |
|---|---|---|---|
| CN | 101218423 A | 7/2008 | |
| EP | 1439291 A2 * | 7/2004 | ............. F02D 21/08 |
| JP | 2010-090848 A | 4/2010 | |

* cited by examiner

*Primary Examiner* — Hieu T Vo (57) ABSTRACT

A control system for an engine includes first and second modules. The first module determines an oxygen concentration within an intake manifold of the engine. The second module regulates a flow of exhaust gas recirculation (EGR) into the intake manifold based on the determined oxygen concentration. In a homogeneous charge compression ignition (HCCI) engine, the second module may also disable an HCCI combustion mode of the HCCI engine based on the oxygen concentration.

20 Claims, 5 Drawing Sheets

SYSTEMS AND METHODS FOR CONTROLLING ENGINE COMBUSTION STABILITY

CROSS-REFERENCE TO RELATED APPLICATIONS

This application claims the benefit of U.S. Provisional Application No. 61/470,139, filed on Mar. 31, 2011. The disclosure of the above application is incorporated herein by reference in its entirety.

FIELD

The present disclosure relates to internal combustion engines and more particularly to systems and methods for controlling engine combustion stability.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that turn a crankshaft and generate drive torque. Homogeneous charge compression ignition (HCCI) engines may operate in different modes. For example, the engine may operate in a conventional spark-ignition (SI) combustion mode or various HCCI combustion modes including an HCCI combustion mode and a mixed HCCI combustion mode. In the SI combustion mode, the A/F mixture within the cylinders is compressed and ignited via spark from spark plugs. In the HCCI combustion mode, the A/F mixture is compressed until the A/F mixture self-ignites. For example, the A/F mixture may automatically combust after exceeding a critical pressure or temperature threshold. The HCCI combustion mode, however, is more difficult to control than the SI combustion mode and therefore may be limited to use during particular operating conditions.

SUMMARY

A control system for an engine includes first and second modules. The first module determines an oxygen concentration within an intake manifold of the engine. The second module regulates a flow of exhaust gas recirculation (EGR) into the intake manifold based on the determined oxygen concentration. In a homogeneous charge compression ignition (HCCI) engine, the second module may also disable an HCCI combustion mode of the HCCI engine based on the oxygen concentration.

A method for controlling an engine includes determining an oxygen concentration within an intake manifold of the engine, and regulating a flow of exhaust gas recirculation (EGR) into the intake manifold based on the determined oxygen concentration. In a homogeneous charge compression ignition (HCCI) engine, the method further includes disabling an HCCI combustion mode of the HCCI engine based on the oxygen concentration.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may, be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Homogeneous charge compression ignition (HCCI) engines may operate in a plurality of combustion modes such as a spark ignition (SI) combustion mode and an HCCI combustion mode. In the HCCI combustion mode, combustion of an air/fuel (A/F) mixture may be more difficult to control. For example, the HCCI combustion mode may be difficult to control (i.e., less stable) at low engine loads. Therefore, the HCCI combustion mode may be limited to use during particular operating conditions. For example, the HCCI combustion mode may be used when engine load is greater than a predetermined load threshold. Poor HCCI combustion may increase noise, vibration, and/or harshness (NVH) thereby decreasing driveability and driver comfort. In addition, poor HCCI combustion may cause the HCCI engine to stall or misfire.

The stability of HCCI combustion may also vary due to engine operating parameters other than engine load. For example, HCCI combustion stability may decrease as an oxygen concentration within an intake manifold decreases. Oxygen concentration in the intake manifold may vary due to exhaust gas recirculation (EGR), blowby vapors, evaporative emission system flow rates, part-to-part manufacturing variation of components (e.g., EGR valves), and/or environmental variations such as barometric pressure and humidity changes. EGR may be regulated by controlling an EGR valve. The EGR valve, however, may leak causing additional exhaust gas to enter the intake manifold. In addition, blowby may vary based on an age (i.e., wear) of the engine. The additional exhaust gas and/or blowby vapors in the intake manifold may decrease the oxygen concentration thereby affecting desired combustion phasing and/or auto-ignitability of the A/F mixture.

Accordingly, systems and methods are presented for improved control of engine combustion stability. The systems and methods may first determine an oxygen concentration within an intake manifold of the engine. For example, the oxygen concentration may be determined using measurements from an oxygen sensor located in the intake manifold. The systems and methods may regulate the flow of EGR into the intake manifold based on the oxygen concentration.

Specifically, the systems and methods may compare the oxygen concentration to an oxygen concentration target and regulate the flow of EGR to match the oxygen concentration target (within EGR valve actuator constraints). This allows the systems and methods to compensate for the previously mentioned unknown variation due to factors such as blowby and/or part-to-part manufacturing variation. The oxygen concentration target may be based on engine operating parameters. For example, the engine operating parameters may include engine load and engine speed. The oxygen concentration target may also be based on additional engine operating parameters such as an engine temperature parameter. For example, the engine temperature parameter may be based on at least one of intake air temperature (IAT), engine coolant temperature (ECT), and engine oil temperature (EOT).

The systems and methods may regulate the flow of EGR into the intake manifold by controlling an EGR valve. Specifically, when the oxygen concentration is greater than the oxygen concentration target, the systems and methods may increase an opening of the EGR valve thereby decreasing the oxygen concentration in the intake manifold (towards the oxygen concentration target). Alternatively, when (i) the oxygen concentration is less than the oxygen concentration target and (ii) the EGR valve is not closed, the systems and methods may decrease the opening of the EGR valve thereby increasing the oxygen concentration within the intake manifold (towards the oxygen concentration target).

In HCCI engines, however, when the oxygen concentration is less than the oxygen concentration target but the EGR valve is closed, the systems and methods may disable the HCCI combustion mode. In other words, EGR valve control may be insufficient to correct the oxygen concentration and therefore HCCI combustion may be too unstable. For example only, if the HCCI engine was operating in the HCCI combustion mode, the systems and methods may disable the HCCI combustion mode and switch to the SI combustion mode. For example, the systems and methods may disable the HCCI combustion mode by controlling the spark plugs and controlling the fuel injectors to adjust at least one of (i) fuel injection quantity and (ii) fuel injection timing. Specifically, the systems and methods may either enable/re-enable the spark plugs or adjust spark timing.

Figure 1:
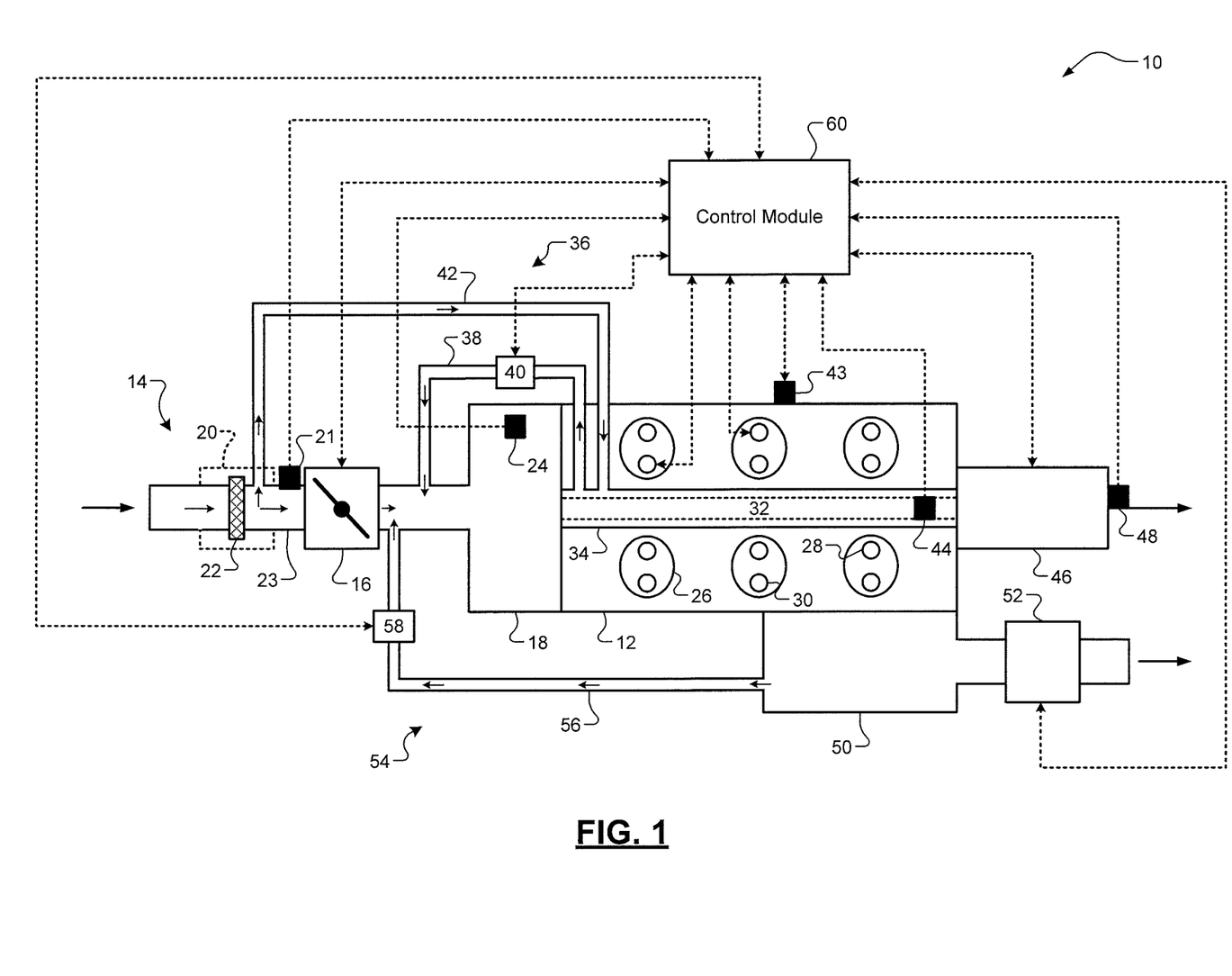
FIG. 1 is a functional block diagram of an example engine system according to one implementation of the present disclosure.

Referring now to FIG. 1, an engine system 10 includes an engine 12. For example only, the engine 12 may be a spark ignition (SI) engine or an HCCI engine. The engine system 10 may also include additional components such as an electric motor and a battery system (not shown). The engine 12 draws air into an intake manifold 18 through an induction system 14 that may be regulated by a throttle 16. For example, the throttle 16 may be electrically controlled using electronic throttle control (ETC). The induction system 14 may include an air filter housing 20 and an air filter 22. The air filter 22 may filter air drawn into the intake manifold 18 to remove particulates. A mass air flow (MAF) sensor 21 measures a rate of airflow through the throttle 16 into the intake manifold 18. For example, the measured MAF rate may indicate a load on the engine 12. An oxygen sensor 24 measures an oxygen concentration of air inside the intake manifold 18. The oxygen sensor 24, however, may also be located in another suitable location within the induction system 14.

Air in the intake manifold 18 is distributed to a plurality of cylinders 26. While six cylinders are shown, the engine 12 may include other numbers of cylinders. Fuel injectors 28 inject fuel into intake ports of the cylinders 26 (port fuel injection) or directly into the cylinders 26 (direct fuel injection). In the SI combustion mode, spark plugs 30 may ignite the compressed A/F mixture within the cylinders 26 to drive pistons which turn a crankshaft 32 and generate drive torque. In the HCCI combustion mode, however, the A/F mixture may be compressed until self-ignition due to exceeding a critical pressure and/or temperature. The crankshaft 32 may be connected to pistons (not shown) of the cylinders 26, respectively, and housed within a crankcase 34 that includes oil for lubrication of moving parts.

A PCV system 36 may draw blow-by vapors from the crankcase 34 and into an air inlet duct 23 at a location downstream from the air filter 22. The PCV system 36 may include a PCV hose 38 that connects the crankcase 34 to the intake manifold 18. The PCV system 36 may also include a PCV valve or other flow regulator 40 that regulates the flow of blow-by vapors from the crankcase 34 to the intake manifold 18. For example, the PCV valve 40 may include a spring-loaded valve (or an orifice or another airflow regulating device) that opens based on pressure differential between the crankcase 34 and the intake manifold 18.

The PCV valve 40 may also be another suitable type of valve or other flow regulator such as an electronic valve controlled by a control module 60. In some implementations the PCV system 36 may further include a breather tube 42 that connects the crankcase to the air filter housing 20 or to the air inlet duct 23 of the induction system 14 at a location downstream from the air filter 22. The breather tube 42 allows fresh air to circulate in the crankcase 34 further diluting the blow-by vapors and preventing oil contamination (i.e., improved circulation).

An engine temperature sensor 43 measures a temperature of the engine 12. For example, the engine temperature sensor 43 may measure IAT, ECT, or EOT. The engine temperature sensor 43, therefore, may be located at another suitable location. In addition, the engine temperature sensor 43 may measure another suitable temperature. In some implementations, two or more engine temperature sensors 43 may be implemented.

An engine speed sensor 44 measures a rotational speed of the crankshaft 32 (i.e., engine speed). For example, the engine speed sensor 44 may measure the engine speed in revolutions per minute (RPM). A transmission 46 transfers the drive torque from the crankshaft 32 to a driveline (e.g., wheels) of a vehicle. In some implementations, the transmission 46 may be coupled to the crankshaft 32 via a fluid coupling such as a torque converter (not shown). A transmission output shaft speed (TOSS) sensor 48 measures a rotational speed of an output shaft of the transmission 46. For example, the TOSS sensor 48 may measure the TOSS in RPM. Measurements from the TOSS sensor 48 may be used to determine vehicle speed.

Exhaust gas resulting from combustion may be expelled from the cylinders 26 into an exhaust manifold 50. An exhaust treatment system (ETS) 52 may treat the exhaust gas in the exhaust manifold 50 to remove particulates and/or decrease emissions before releasing the exhaust gas into the atmosphere. For example, the ETS 52 may include at least one of oxidation catalysts, nitrogen oxide absorbers/adsorbers, selective catalytic reduction systems, particulate matter filters, and three-way catalytic converters. An EGR system 54 circulates exhaust gas from the exhaust manifold 50 back into the intake manifold 18. The EGR system 54 includes an EGR line 56 that connects the exhaust manifold 50 and the intake manifold 18. The EGR system 54 further includes an EGR valve 58 that regulates the flow of exhaust gas into the intake manifold 18.

The control module 60 controls operation of the engine system 10. The control module 60 may receive signals from the throttle 16, the MAF sensor 21, the oxygen sensor 24, the fuel injectors 28, the spark plugs 30, the PCV valve 40, the engine temperature sensor 43, the engine speed sensor 44, the transmission 46, the TOSS sensor 48, the ETS 52, and/or the EGR valve 58. The control module 60 may control the throttle 16, the fuel injectors 28, the spark plugs 30, the PCV valve 40, the transmission 46, the ETS 52, and/or the EGR valve 58. The control module 60 may also implement the systems or methods of the present disclosure.

Figure 2:
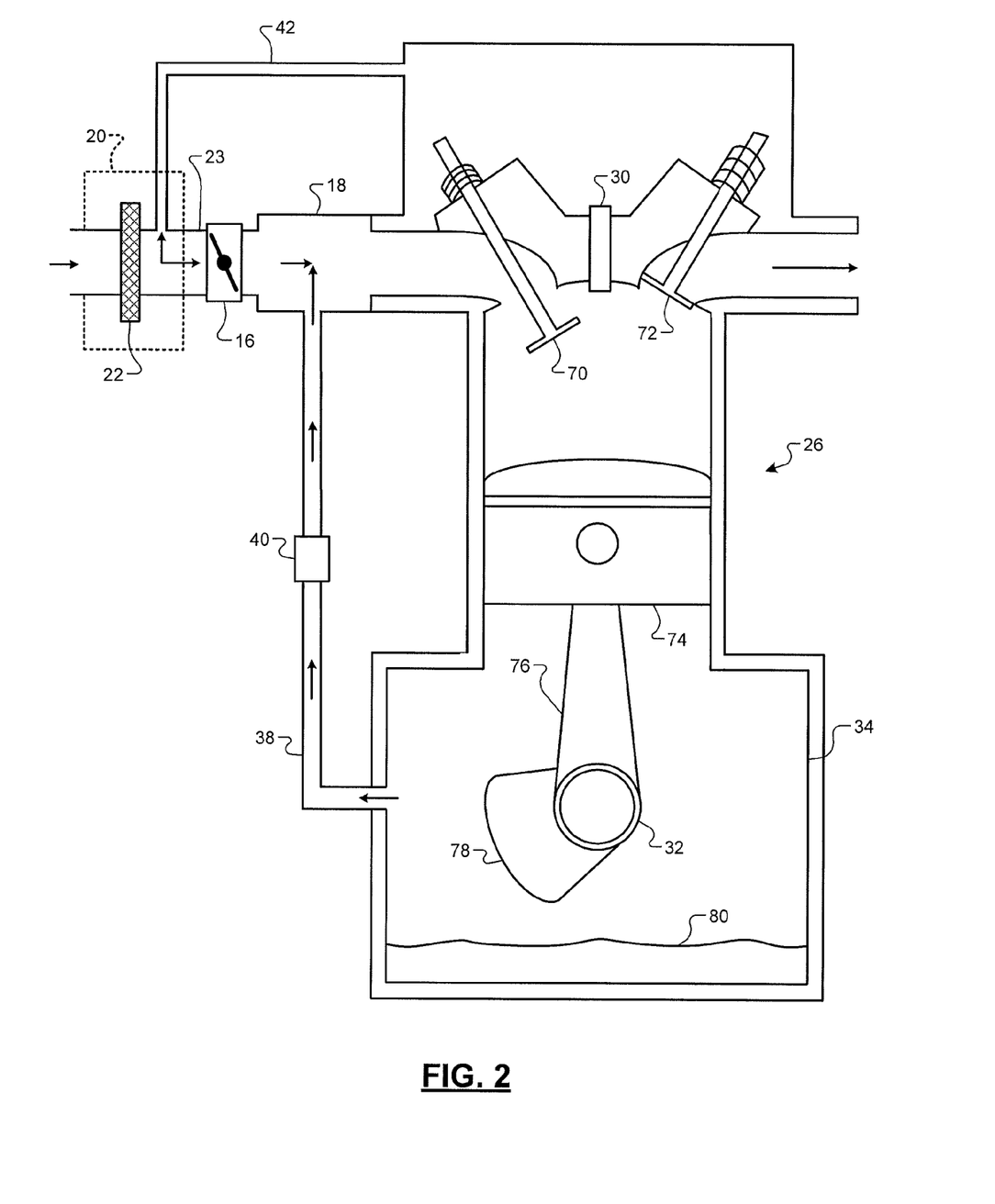
FIG. 2 is a cross-sectional view of a cylinder according to one implementation of the present disclosure.

Referring now to FIG. 2, an example of one of the plurality of cylinders 26 is shown. The example cylinder 26 illustrates additional cylinder components in addition to the PCV system 36. The cylinder 26 draws in air from the intake manifold 18 via an intake valve 70. In some implementations, the cylinder 26 may inject fuel into the air to create the A/F mixture at a location before the intake valve 70 (port fuel injection). The cylinder 26 expels exhaust gas produced during combustion into the exhaust manifold 50 via an exhaust valve 72. The intake valve 70 and the exhaust valve 72 may be actuated by one or more camshafts (not shown). The control module 60 may further control timings of the intake valve 70 and/or the exhaust valve 72. The control module 60 may also control the lift height and opening duration of the intake valve 70 and/or the exhaust valve 72.

The cylinder 26 further includes a piston 74. The piston 74 compresses the A/F mixture within the cylinder 26 during a compression stroke of the engine 12. The A/F mixture is combusted (e.g., either auto-ignited or via assist from the spark plug 30) which drives the piston 74 downward generating drive torque. The drive torque rotates the crankshaft 32 which is connected to the piston 74 using a connecting rod 76. The crankshaft 32 may be connected to a counterweight 78. The crankcase 34 houses the various components of the cylinder 26. Specifically, the crankcase 34 includes oil 80 that lubricates the moving parts of the cylinder 26.

As previously described, blow-by vapors may enter the crankcase 34 and contaminate the oil 80 causing damage and/or decreased performance. The PCV system 36, however, vents blow-by vapors from the crankcase 34. Specifically, the PCV hose 38 may connect the crankcase 34 to the intake manifold 18 at a location downstream from the throttle 16. The PCV valve 40 may open when the blow-by vapors build up to exceed a critical pressure, thereby venting the blow-by vapors from the crankcase 34 into the intake manifold 18. Additionally, as previously described, the PCV system 36 may further include a breather tube 42 that connects the crankcase 34 to the air inlet duct 23 at a location downstream from the air filter 22. In other words, filtered air may flow through the breather tube 42 into the crankcase 34 further diluting the blow-by vapors and improving circulation which improves performance of the PCV system 36.

Figure 3:
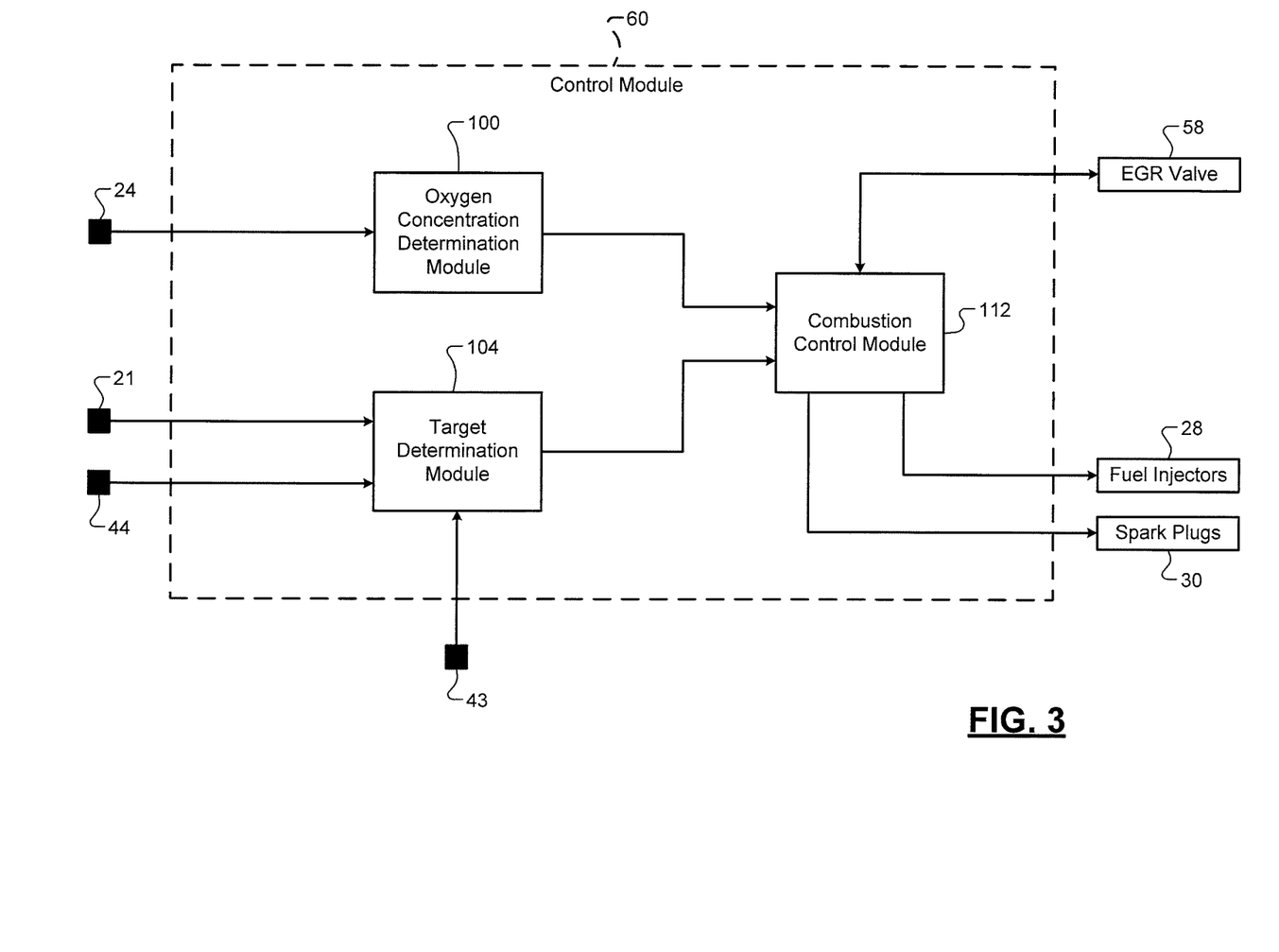
FIG. 3 is a functional block diagram of an example control module according to one implementation of the present disclosure.

Referring now to FIG. 3, an example of the control module 60 is shown. The control module 60 may include an oxygen concentration determination module 100, a target determination module 104, and a combustion control module 108. The oxygen concentration determination module 100 receives measurements from the oxygen sensor 24 in the intake manifold 18. The oxygen concentration determination module 100 determines an oxygen concentration of air within the intake manifold 18 based on the measurements from the oxygen sensor 24.

The target determination module 104 determines an oxygen concentration target based on engine operating parameters. The engine operating parameters may include engine load and engine speed. Engine load may be based on measurements from the MAF sensor 21 or estimated delivered fuel mass. Engine speed may be based on measurements from the engine speed sensor 44. The engine operating parameters may also include other suitable parameters such as an engine temperature parameter. For example, the engine temperature parameter may be one of IAT, ECT, and EOT (measured by engine temperature sensor 43). For example only, the oxygen concentration target may be determined based on the engine operating parameters using a look-up table.

The combustion control module 108 receives the oxygen concentration from the oxygen concentration determination module 100. The combustion control module 108 also receives the oxygen concentration target from the target determination module 104. The combustion control module 108 selectively controls (i) the EGR valve 58 or (ii) in the case of an HCCI engine, a combustion mode of the engine 12, based on the oxygen concentration, the oxygen concentration target, and whether the EGR valve 58 is closed.

When the oxygen concentration is greater than the oxygen concentration target, the combustion control module 108 may increase an opening of the EGR valve 58. The increased EGR may decrease the oxygen concentration in the intake manifold 18 (towards the oxygen concentration target) thereby improving combustion stability. When (i) the oxygen concentration is less than the oxygen concentration target and (ii) the EGR valve 58 is not closed, the combustion control module 108 may decrease the opening of the EGR valve 58. The decreased EGR may increase the oxygen concentration in the intake manifold 18 (towards the oxygen concentration target) thereby improving combustion stability and phasing.

However, in an HCCI engine, when (i) the oxygen concentration is less than the oxygen concentration target and (ii) the EGR valve 58 is closed, an indicator may be set and stored in memory. For example, the indicator may indicate that HCCI combustion mode may not be used. In other words, because the EGR valve 58 is already closed, controlling the EGR valve 58 cannot increase the oxygen concentration within the intake manifold 18 and therefore the HCCI combustion mode is disabled. For example only, the combustion control module 108 may switch to the SI combustion mode if the HCCI engine 12 was operating in the HCCI combustion mode. Additionally, for example, the combustion control module 108 may disable the HCCI combustion mode by controlling the spark plugs 30 and controlling the fuel injectors 28 to adjust at least one of (i) fuel injection quantity and (ii) fuel injection timing.

Figure 4A:
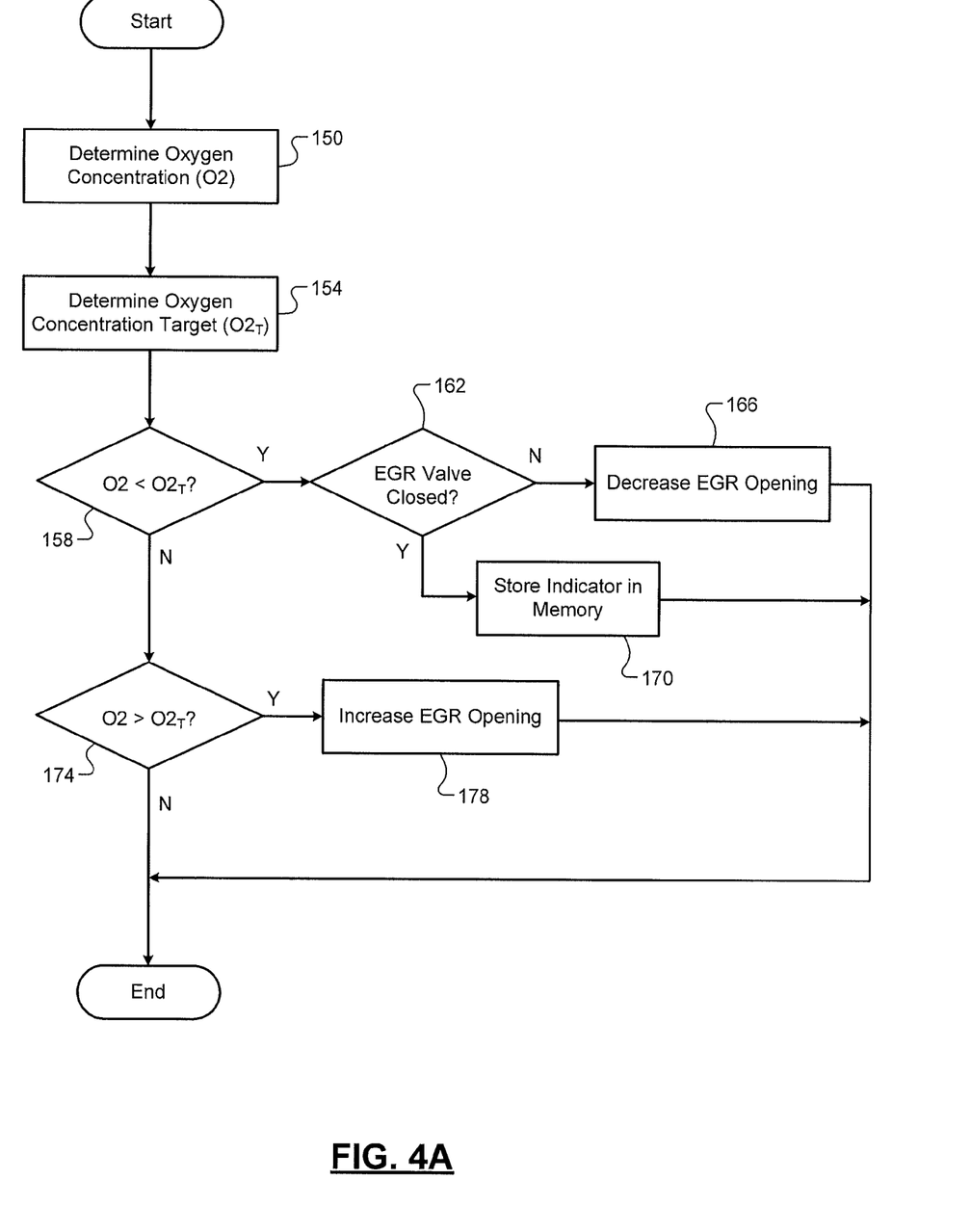
FIG. 4A is a flow diagram illustrating an example of a method of controlling combustion stability according to one implementation of the present disclosure.

Referring now to FIG. 4A, a first example method for controlling combustion stability begins at 150. While a single control loop is shown, the control loop may be repeated more than once. For example only, the control loop may run continuously. At 150, the control module 60 determines the oxygen concentration (O2) within the intake manifold 18. At 154, the control module 60 determines an oxygen concentration target ($O2_T$) based on the engine operating parameters. At 158, the control module 60 determines whether the oxygen concentration O2 is less than the oxygen concentration target $O2_T$. If true, control may proceed to 162. If false, control may proceed to 174.

At 162, the control module 60 determines whether the EGR valve 58 is closed. If true, control may proceed to 166. If false, control may proceed to 170. At 166, the control module 60 may decrease an opening of the EGR valve 58 thereby increasing the oxygen concentration in the intake manifold 18. Control may then end (for this control loop). At 170, the control module 60 may set and store an indicator to indicate that control of the EGR valve 58 is insufficient to increase the oxygen concentration. Control may then end (for this control loop). However, in an HCCI engine, the control module 60 may also then disable the HCCI combustion mode due to the low oxygen concentration and inability of EGR valve control to increase the oxygen concentration.

At 174, the control module 60 determines whether the oxygen concentration O2 is greater than the oxygen concentration target $O2_T$. If true, control may proceed to 178. If false (i.e., the oxygen concentration O2 equals the oxygen concentration target $O2_T$), control may end. At 178, the control module 60 may increase the opening of the EGR valve 58 thereby decreasing the oxygen concentration in the intake manifold 18. Control may then end (for this control loop).

Figure 4B:
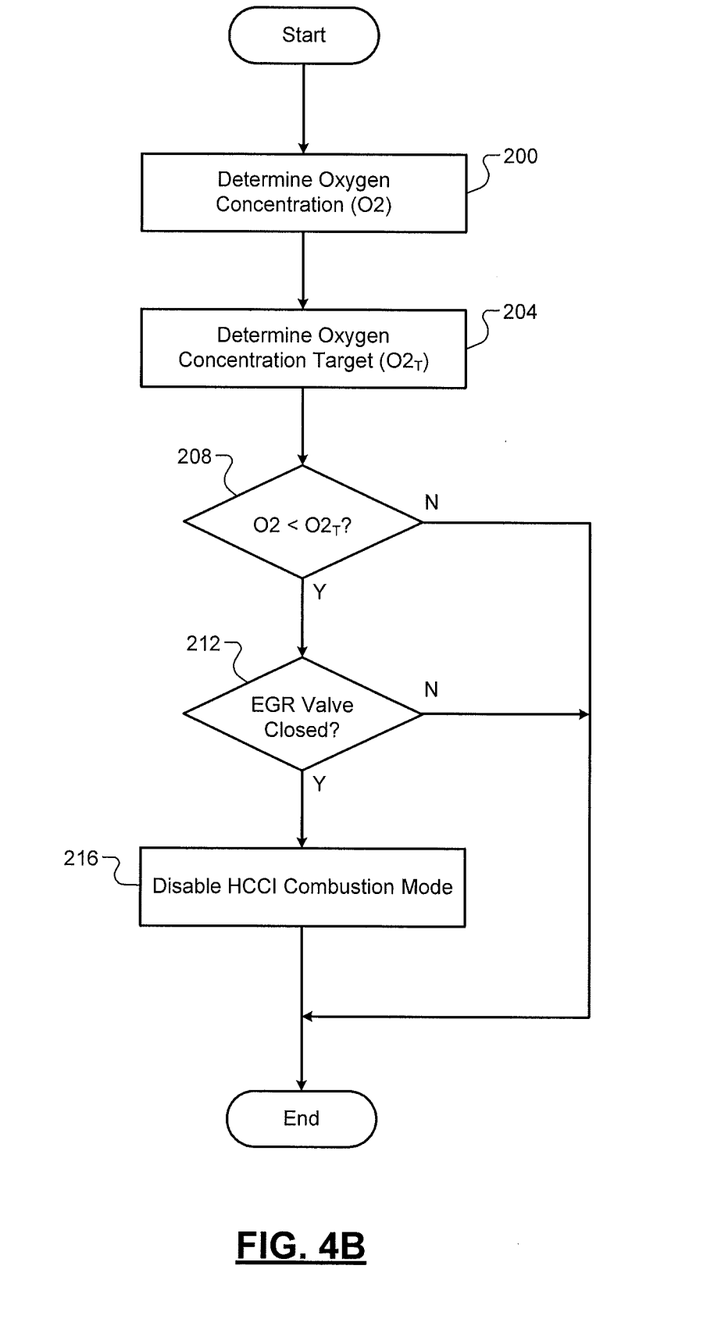
FIG. 4B is a flow diagram illustrating an example of a method of controlling combustion stability in a homogeneous charge compression ignition (HCCI) engine according to another implementation of the present disclosure.

Referring now to FIG. 4B, an example of a method for controlling combustion stability in an HCCI engine begins at 200. While a single control loop is shown, the control loop may be repeated more than once. For example only, the control loop may run continuously. At 200, the control module 60 may determine the oxygen concentration (O2) within the intake manifold 18. At 204, the control module 60 may determine the oxygen concentration target ($O2_T$) based on the engine operating parameters. At 208, the control module 60 may determine whether the oxygen concentration O2 is less than the oxygen concentration target $O2_T$. If false, control may end (for this control loop) because the oxygen concentration O2 is either equal to the oxygen concentration target $O2_T$ or greater than the oxygen concentration target $O2_T$ and therefore correctable via EGR valve control.

If true, however, control may proceed to 212. At 212, the control module 60 may determine whether the EGR valve 58 is closed. If true, control may proceed to 216. If false, control may end (for this control loop) because the oxygen concentration O2 is correctable via EGR valve control. At 216, the control module 60 may disable the HCCI combustion mode (and therefore may switch to the SI combustion mode) because the oxygen concentration O2 is less than the oxygen concentration target $O2_T$ and not correctable via EGR valve control. Control may then end (for this control loop).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
a first module that determines an oxygen concentration within an intake manifold of the engine; and
a second module that regulates a flow of exhaust gas recirculation (EGR) into the intake manifold based on the determined oxygen concentration,
wherein the engine is a homogeneous charge compression ignition (HCCI) engine, and
wherein the second module selectively disables an HCCI combustion mode of the HCCI engine when the EGR valve is closed based on the determined oxygen concentration.

2. The control system of claim 1, wherein the second module regulates the flow of EGR into the intake manifold by controlling an EGR valve based on the determined oxygen concentration and an oxygen concentration target.

3. The control system of claim 2, wherein the second module increases an opening of the EGR valve when the determined oxygen concentration is greater than the oxygen concentration target.

4. The control system of claim 2, wherein the second module decreases an opening of the EGR valve when (i) the determined oxygen concentration is less than the oxygen concentration target and (ii) the EGR valve is not closed.

5. The control system of claim 2, further comprising a third module that determines the oxygen concentration target based on engine speed and engine load.

6. The control system of claim 5, wherein the third module determines the oxygen concentration target further based on an engine temperature parameter.

7. The control system of claim 6, wherein the engine temperature parameter is based on at least one of intake air temperature (IAT), engine coolant temperature (ECT), and engine oil temperature (EOT).

8. The control system of claim 1, wherein the first module determines the oxygen concentration within the intake manifold of the engine based on measurements from an oxygen sensor in the intake manifold.

9. A control system for an engine, the control system comprising:
a first module that determines an oxygen concentration within an intake manifold of the engine; and
a second module that regulates a flow of exhaust gas recirculation (EGR) into the intake manifold by controlling an EGR valve based on the determined oxygen concentration and an oxygen concentration target, wherein the second module decreases an opening of the EGR valve when (i) the determined oxygen concentration is less than the oxygen concentration target and (ii) the EGR valve is not closed, and wherein the engine is a homogeneous charge compression ignition (HCCI) engine, and wherein the second module disables an HCCI combustion mode of the HCCI engine when (i) the determined oxygen concentration is less than the oxygen concentration target and (ii) the EGR valve is closed.

10. The control system of claim 9, wherein the second module disables the HCCI combustion mode by (i) controlling spark plugs and (ii) adjusting at least one of fuel injection quantity and fuel injection timing.

11. A method for controlling an engine, the method comprising:
   determining an oxygen concentration within an intake manifold of the engine;
   regulating a flow of exhaust gas recirculation (EGR) into the intake manifold based on the determined oxygen concentration,
   wherein the engine is a homogeneous charge compression ignition (HCCI) engine; and
   selectively disabling an HCCI combustion mode of the HCCI engine when the EGR valve is closed based on the determined oxygen concentration.

12. The method of claim 11, further comprising regulating the flow of EGR into the intake manifold by controlling an EGR valve based on the determined oxygen concentration and an oxygen concentration target.

13. The method of claim 12, further comprising increasing an opening of the EGR valve when the determined oxygen concentration is greater than the oxygen concentration target.

14. The method of claim 12, further comprising decreasing an opening of the EGR valve when (i) the determined oxygen concentration is less than the oxygen concentration target and (ii) the EGR valve is not closed.

15. The method of claim 12, further comprising determining the oxygen concentration target based on engine speed and engine load.

16. The method of claim 15, further comprising determines the oxygen concentration target further based on an engine temperature parameter.

17. The method of claim 16, wherein the engine temperature parameter is based on at least one of intake air temperature (IAT), engine coolant temperature (ECT), and engine oil temperature (EOT).

18. The method of claim 11, further comprising determining the oxygen concentration within the intake manifold of the engine based on measurements from an oxygen sensor in the intake manifold.

19. A method for controlling an engine, the method comprising:
   determining an oxygen concentration within an intake manifold of the engine;
   regulating a flow of exhaust gas recirculation (EGR) into the intake manifold by controlling an EGR valve based on the determined oxygen concentration and an oxygen concentration target;
   decreasing an opening of the EGR valve when (i) the determined oxygen concentration is less than the oxygen concentration target and (ii) the EGR valve is not closed,
   wherein the engine is a homogeneous charge compression ignition (HCCI) engine; and
   disabling an HCCI combustion mode of the HCCI engine when (i) the determined oxygen concentration is less than the oxygen concentration target and (ii) the EGR valve is closed.

20. The method of claim 19, further comprising disabling the HCCI combustion mode by (i) controlling spark plugs and (ii) adjusting at least one of fuel injection quantity and fuel injection timing.

* * * * *